3,312,743
PREPARATION OF POLYTHIOETHERS
Hans-Georg Schmelzer, Cologne-Buchforst, and Hans Holtschmidt, Cologne-Stammheim, Germany, assignors to Farbenfabriken Bayer Aktiengesellschaft, Leverkusen, Germany, a corporation of Germany
No Drawing. Filed Oct. 28, 1963, Ser. No. 319,520
Claims priority, application Germany, Oct. 30, 1962, F 38,186
5 Claims. (Cl. 260—609)

This invention relates generally to the preparation of polyethers and, more specifically, to the preparation of polythioethers by the polycondensation of thiodiglycol in the presence of a novel etherifying catalyst.

In the polycondensation of thiodiglycol in the presence of p-toluene sulphonic acid, sulfuric acid, or any of the other usual etherifying catalysts, the side reactions which take place are so favored that the yields of the polycondensate are limited to between 40 and 60 percent. The cyclic by-products include large quantities of thioxane and slightly smaller quantities of dithiane

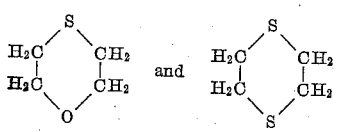

Both thioxane and dithiane have an extremely unpleasant odor which necessitates an expensive deodorization of the polycondensate product. In addition, these compounds impart a dark color to the polycondensate which renders it useless for further processing leading to the preparation of synthetic resins. Consequently, the preparation of high molecular weight polycondensates is not attempted because of the further decrease in the yield due to the increase in the cyclization reactions which occurs in the process of their preparation.

Heretofore, in the polycondensation of thiodiglycol to prepare polythioethers having the general formula

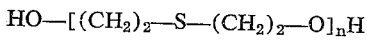

where $n=2$ or more, yields of 90 to 98 percent have been obtained if phosphoric acid or phosphoric acid derivatives were used in quantities of 0.1 to 10 percent as etherifying catalysts and the reaction was carried out at temperatures above 150° C. Under these conditions, much less thioxane is formed and the formation of dithiane is almost completely prevented. Moreover, the polycondensates prepared in the presence of phosphoric acid are much lighter in color than the products prepared in the presence of other etherifying agents.

However, a considerable amount of the cyclic impurity is present in the polycondensate so that the color of the polythioether is still objectionable and the odor of the dithiane and the thioxane is not completely eliminated. In addition, the condensation reaction requires a relatively long time and the amount of phosphoric acid or the phosphoric acid derivative required in the reaction mixture is usually about 5 percent by weight calculated on the total weight of the starting materials in the reaction mixture. The use of such a large amount of such an acidic agent requires that it be removed from the polycondensate so that it in no way interferes with subsequent processes for converting the polythioether to synthetic resins especially by the isocyanate addition process, for example, by the formation of bubbles. The process of removing the phosphoric acid or phosphoric acid derivative is involved and requires washing, treatment with ammonia or neutralization followed by separation of the salts.

It is therefore an object of this invention to provide an improved method for the preparation of polyethers by the polycondensation of thiodiglycol which is devoid of the foregoing disadvantages. It is a further object of this invention to provide a process for the preparation of polythioethers in which the objectionable side reactions are eliminated by half over the above mentioned method. Still another object of this invention is to provide a method for the polycondensation of thiodiglycol in which the product has an improved color and the condensation time is significantly reduced. A still further object of this invention is to provide an etherifying catalyst that is efficient in small quantities to accomplish the above listed objects.

The foregoing objects and others which will become apparent from the following description are accomplished in accordance with this invention, generally speaking, by providing an improved method for the preparation of poly(alkylene ether) thioether polyols, preferably those having from two to four hyrdoxyl groups, by the polycondensation of thiodiglycol at temperatures above 150° C. in the presence of phosphorous acid or its derivatives such as halides, acid ammonium phosphites, mono-, di- and tri-esters, amides and ester amides of phosphorous acid or phosphonous acids and their halides, esters, amides and ester amides, in catalytic amounts, preferably in quantities of about 0.05 to 10 percent by weight calculated on the total weight of the starting materials in the polycondensation reaction mixture, in which any water formed is removed and the final phase of the condensation is carried out in vacuo, if desired.

When using the etherifying agents of this invention for the polycondensation of thiodiglycol, the condensation times are considerably shorter than those required in the presence of phosphoric acid. This may be attributed to the very high velocity at which ester equilibrium is attained in the case of phosphorous acid. Furthermore, the formation of thioxane and dithiane, which is not completely eliminated even when the catalytic agents of this invention are used, and which are still of considerable import because of the odor of these products, is again reduced by about half. Therefore, if a 90 percent yield is obtained using phosphoric acid, a yield of at least 93 percent may be expected when the etherifying catalysts of this invention are used, even in the region of the lower —OH numbers. Furthermore, complete deodorization of the polycondensates, which is necessary if they are to be used in the preparation of synthetic resins, can be effected by relatively simple methods as a result. The color of the polythioethers prepared with the catalytic agents of this invention instead of with phosphoric acid is also greatly improved. This effect is particularly marked if the starting materials are of only commercial purity, and many perhaps be explained by the reducing effect of these agents. Completely colorless polycondensates are obtained when pure starting materials are used. In addition, strictly linear products are obtained when the catalysts of this invention are used for the polycondensation of thiodiglycol since the esterification of the phosphorous acid clearly stops at the stage of dialkyl phosphite.

The advantages of phosphorous or phosphonous acids and their derivatives over phosphoric acid in the polycondensation of thiodiglycol are unanticipated since the acidity constants of phosphorous acid are about of the same order of magnitude as the first two acidity constants of orthophosphoric acid.

According to the present invention, phosphorous acid or any suitable derivative thereof may be used as an etherifying catalyst, such as the halides acid ammonium phosphites, mono-, di- and tri-esters, and amides and ester amides of phosphorous acid. Some specific examples of such compounds which are suitable in the practice of this invention are phosphorous trichloride, phosphorous trifluoride, phosphorous tribromide, phosphorous triiodide, ammonium hydrogen phosphite, phosphorous acid monomethyl ester, phosphorous acid monoethyl ester, phosphorous acid monoisopropyl ester, phosphorous acid dimethyl ester, phosphorous acid diethyl ester, phosphorous acid diphenyl ester, phosphorous acid triethyl ester, phosphorous acid trihexylester, phosphorous acid trioctyl ester and other esters with ester groups up to about 20 carbon atoms, phosphorous acid diethyl ester chloride, phosphorous acid-tri-(dimethylamide), phosphorous acid ethyl ester-(dimethylamide)-chloride, phosphorous acid-di-(dimethylamide), phosphorous acid tri-(diethylamide), phosphorous acid methyl ester-di-(dipropylamide), phosphorous acid-di-(dimethylamide)-chloride and phosphorous acid dipropylester mono-(dibutylamide). In addition, any suitable phosphonous acid or any suitable derivative thereof such as halides, esters, amides and ester amides may be used according to the method of the present invention. Some specific examples of such suitable compounds are ethane phosphonous acid, benzene phosphonous acid, ethane phosphonous acid ethyl ester-(dimethylamide) and ethane phosphonous acid-di-(dimethylamide) and the equivalents of the phosphonous acid type corresponding to the above-listed phosphorous acid derivatives.

In a preferred embodiment of this invention, the polycondensation of thiodiglycol is carried out between about 150° C. and 210° C., and most preferably at about 170° C. in the presence of a catalytic amount of phosphorous acid or a phosphonous acid or a suitable derivative thereof, but preferably between 0.05 and 0.5 percent by weight of the etherifying catalyst is used, calculated on the total weight of the starting materials in the reaction mixture. The water formed in the polycondensation of thiodiglycol is then removed and a vacuum is applied in the final phase of the preparation of the polythioether.

Since the phosphite esters are known to be excellent antioxidants for polymers and particularly for polycondensates, it is preferable to allow the etherifying catalyst which is used in accordance with this invention, and which is partly incorporated in the polythioether chain as the dialkyl ester, to remain in the polycondensate. This will prevent the autooxidation processes in the finished polythioethers which lead to the formation of small quantities of thioxane and dithiane after some time so that the unpleasant smell of these compounds is again imparted to the polycondensate.

Since a considerably shorter condensation time is involved when the etherifying catalysts of this invention are used, the quantity of the phosphorous or phosphonous acid or their derivatives may be kept relatively small so that the catalyst in no way interferes with the subsequent processes for converting polythioethers to synthetic resins. However, for particular applications, the etherifying catalysts used in accordance with this invention may be removed from the polycondensates by washing or by treatment with ammonia or by neutralization followed by separation of the salts.

While the thiodiglycol is condensed with itself to form a polythioether according to the method of this invention, the thiodiglycol may also be condensed with any other suitable alcohol containing two or more hydroxyl groups if a modification of the polycondensate is desired, for example, with regard to crystallinity. Such alcohols are, for example, ethylene glycol, propanediol-(1:2), propanediol-(1:3), butanediol-(1:4), hexanediol-(1:6), and di- and triethylene glycol. Branched polythioethers can also be obtained by the incorporation of any suitable polyhydric alcohol such as trimethylolpropane, glycerol, or pentaerythritol in the polycondensation reaction.

The polycondensates prepared according to this invention are excellent for use in further processes leading to the production of synthetic resins, particularly by the isocyanate polyaddition process. It is preferable to use those in which $n$ in the above formula represents a number from 10 to 20.

In order to describe the invention more fully and further clarify the description, the following is a specific embodiment thereof.

Example 1

About 2100 parts by weight of thiodiglycol, about 900 parts by weight of triethylene glycol and about 12 parts by weight of phosphorous acid are heated to about 170° C. and stirred while nitrogen or carbon dioxide is passed through the reaction mixture. About 400 ml. of water are split off after about 14 hours. The —OH number of the polycondensate is about 110. A water jet vacuum is applied for about three hours at about 170° C. Depending on the purity of the starting materials, a 93 percent yield of a pale yellow to colorless liquid product with an average molecular weight of about 2000 is obtained.

Example 2

3000 parts by weight of thiodiglycol are heated with 9 parts by weight of phosphorous acid and stirred to about 170° C. while carbon dioxide is passed through the reaction mixture. 400 parts by weight of water are split off within seven hours. The OH number of the polycondensate is 224. A water jet vacuum is applied for six hours at 170° C. During this time further 40 parts by weight of water are split off. A yellow viscous oil remains with an OH number of 96. The product solidifies while standing. The yield is 93 percent. The condensation time, however, is by far shorter than in case of phosphoric acid as catalyst.

Example 3

The procedure is as in Example 2, but with 12 parts by weight of phosphorous acid. After six hours heating to 170° C. under normal conditions 450 parts by weight of water are split off. The pale-yellow solid polycondensate has an OH number of 58.

Example 4

1830 parts by weight of thiodiglycol and 1180 parts by weight of 1,6-hexane diol are heated in the presence of 12 parts by weight of phosphorous acid at 180° C. for 14 hours under normal conditions and for further 11 hours in a water jet vacuum 450 parts by weight of water are split off. The pale-yellow polyether has an OH number of 63. The yield is 2400 parts by weight, that is 94 percent of theory.

Example 5

500 parts by weight of thiodiglycol, 30 parts by weight of trimethylol propane and 9 parts by weight of phosphorous acid yield after seven hours heating under normal conditions and two hours heating in a water jet vacuum at 170° C. 450 parts by weight of water and 2400 parts by weight of a pale-yellow solid polycondensate (OH number 99).

Example 6

210 parts by weight of thiodiglycol, 90 parts by weight of triethylene glycol and 1 part by weight of triethylene phosphite are heated to 180° C. for 24 hours. 40 parts by weight of water are split off. A pale-yellow polythioether having an average molecular weight of 1000 is obtained in practically quantitative yield.

Example 7

The procedure is as in Example 6, but using 1 part by weight of phosphorous acid-tris-(dimethyl amide) and a catalyst. After 36 hours reaction time a pale-yellow polycondensate (OH number 310) is obtained in practically quantitative yield.

Example 8

The polycondensation is as in Examples 6 and 7, but using 1 part by weight of ethane phosphonous acid dichloride or 1 part by weight of triphenyl phosphite or 1 part by weight of ethane phosphonous acid. After 25 hours reaction time a colorless polythioether (OH number 149) is obtained in a nearly quantitative yield.

It is to be understood that the invention may be practiced using other alcohols herein disclosed and any of the other phosphorous or phosphonous compounds described as suitable herein.

Although the invention has been described in considerable detail in the foregoing for the purpose of illustration it is to be understood that variations may be made by those skilled in the art without departing from the spirit and scope of the invention, except as is set forth in the claims.

What is claimed is:

1. A method for the preparation of polythioethers which comprises condensing thiodiglycol at temperatures above about 150° C. in the presence of an etherifying catalyst selected from the group consisting of phosphorous acid, phosphorous acid halides, phosphorous acid esters and ester amides having from 1 to 20 carbon atoms in each ester grouping, acid ammonium phosphites, phosphorous acid amides, phosphonous acids, phosphonous acid halides, phosphonous acid esters and ester amides having from 1 to 20 carbon atoms in each ester grouping and phosphonous acid amides in a catalytic amount.

2. A method for the preparation of polythioethers which comprises condensing thiodiglycol with itself at temperatures above about 150° C. in the presence of an etherifying catalyst selected from the group consisting of phosphorous acid, phosphorous acid halides, phosphorous acid esters and ester amides having from 1 to 20 carbon atoms in each ester grouping, acid ammonium phosphites, phosphorous acid amides, phosphonous acids, phosphonous acid halides, phosphonous acid esters and ester amides having from 1 to 20 carbon atoms in each ester grouping and phosphonous acid amides in quantities of from about 0.5 to about 10% by weight.

3. A method for the preparation of polythioethers which comprises condensing a thiodiglycol with an alcohol containing more than one hydroxyl group at temperatures above about 150° C. in the presence of an etherifying catalyst selected from the group consisting of phosphorous acid, phosphorous acid halides, phosphorous acid esters and ester amides having from 1 to 20 carbon atoms in each ester grouping, acid ammonium phosphites, phosphorous acid amides, phosphonous acids, phosphonous acid halides, phosphonous acid esters and ester amides having from 1 to 20 carbon atoms in each ester grouping and phosphonous acid amides in a catalytic amount.

4. The method of claim 3 in which the temperature is 170° C.

5. A method for the preparation of polythioethers which comprises condensing thiodiglycol with an alcohol containing more than one hydroxyl group at temperatures above about 150° C. in the presence of an etherifying catalyst selected from the group consisting of phosphorous acid, phosphorous acid halides, phosphorous acid esters and ester amides having from 1 to 20 carbon atoms in each ester grouping, acid ammonium phosphites, phosphorous acid amides, phosphonous acids, phosphonous acid halides, phosphonous acid esters and ester amides having from 1 to 20 carbon atoms in each ester grouping and phosphonous acid amides in quantities of from about 0.5 to about 10% by weight.

References Cited by the Examiner

FOREIGN PATENTS 644,863    7/1962    Canada.

CHARLES B. PARKER, Primary Examiner.

D. R. PHILLIPS, Assistant Examiner.